E. Leigh,
System of Pronouncing Orthography,
N° 78,296. Patented May 26, 1868.

III your eyes?" said his mother; "I see a great many things falling."
4. "Where?" inquired Willie eagerly. "I can see nothing at all but drops of rain."
5. "Well, and what are drops of rain made of?"
6. "They are made of water," replied Willie.
7. "And what are the clouds made of?"
8. "Why, you once told me they were made of water, too."
9. "Well, then, my dear, when a cloud falls it does not come down plump upon your head like a pail of water, as you thought it did; but it falls in drops, and those drops are called rain."
10. "How droll it is!" cried Willie. "Then rain is a cloud tumbling down to the ground?"

rye head

Edwin Leigh.

United States Patent Office.

EDWIN LEIGH, OF ST. LOUIS, MISSOURI.

Letters Patent No. 78,296, dated May 26, 1868; antedated May 19, 1868.

IMPROVEMENT IN SYSTEMS OF PRONOUNCING-ORTHOGRAPHY.

*The Schedule referred to in these Letters Patent and making part of the same.*

TO ALL WHOM IT MAY CONCERN:

Be it known that I, EDWIN LEIGH, of St. Louis, in the county of St. Louis, and State of Missouri, have invented an Improved Pronouncing-Orthography; and I do hereby declare that the following, taken in connection with the drawings which accompany and form part of this specification, is a description of my invention, sufficient to enable those skilled in the art to practise it.

The invention relates to the art of representing the proper pronunciation of words by combinations of letters.

The common letters of the alphabet, a, b, c, &c., I call "alphabetic letters," whatever differences in form they may assume, as A, a, *a*, &c., (see Drawing I, a; 1, 2, 3, 4, 5, 6, 7, 8, 9.) All of these letters are a's; each has the name "a," and each and every one, when considered as an "a," or a letter of the alphabet, I call an alphabetic "a," (see also the forms of other letters in Drawing I.)

The special and peculiar forms of the alphabetic letters, which I construct or use to denote particular sounds, I call, in reference to this use, "phonic letters." As, for example, each of the different forms of the "alphabetic letter" a (shown in Drawing I, a; 1, 2, 3, 4, 5, 6, 7, 8, 9,) is a phonic letter, appropriated to denote a particular sound of the "alphabetic a," and that sound only, (see phonic letters, arranged, Drawing II.)

When parts of an alphabetic letter are printed in heavier lines, and more distinctly, to denote a particular sound, (see Drawing I, y; 2 and 3, compared with i; 1 and 2, and g; 2, compared with j; 1,) I call the distinct and heavier part of the letter a "phonic sign," because it is, to the learner, the sign of the sound to which it is appropriated. The whole of each of these forms of y, g, a G, considered as a sign for the sound to which it is appropriated, I call a "phonic letter;" but the letter i, (see Drawing I, i, 1,) which denote the long sound of i in ice, is not only a phonic letter, but a phonic sign, while the letter y, (see Drawing I, y, 2,) which denotes the same sound, the long sound of y in by, is a phonic letter, but only the heavy part of it the long i in the y; is the phonic sign, (see other letters in Drawing I; see also Drawing III.)

Heretofore, the pronunciation of orthography in those languages which (like the English, and, to some extent, the French, German, Italian, &c.,) have an orthography that does not accurately indicate the sounds of words, has either been left unrepresented, or represented by the addition of accents or diacritical marks, and sometimes by the use of italics, or smaller letters for silent letters.

These methods have so bristled the page with accent-marks, changed the aspect of the words and the printed page, violated good taste and harmony in the appearance of print, and furnished such indefinite and insufficient signs of sound, that they have not been found to be practically adapted for use in reading-books, and have been employed chiefly in spelling-books and dictionaries, and in them they are of very little practical value to beginners. On the other hand, phonetic print, or phonotypy, has been tried and found to be of immense value for the purpose of teaching beginners; but its change of the orthography, its strange aspect, and the radical changes it involves, have utterly defeated the most energetic efforts to put it into general and practical use in the instruction of beginners.

In order to obviate these evils, I have devised my system of pronouncing-orthography, whereby—

First, I furnish, for phonic letters and phonic signs, definite and distinct objects or forms, which are truly practical and available to the learner.

Second, I make each phonic letter or phonic sign denote invariably but one and the same sound.

Third, I secure, as far as practicable in connection with the common spelling, a uniform phonic sign for each sound in those cases where different alphabetic letters must be used to stand for it; while, Fourth, the general and characteristic form of the alphabetic letters a, b, c, &c., is preserved, so that in spelling words they will be readily recognized, and called by their names, a, b, c, &c.

Fifth, I preserve, as perfectly as practicable, the outline of each word or word-picture, so that it will be readily recognized in reading, whether it be printed in my pronouncing-orthography or in the common letters now used in books, and so that it will have the old familiar look to the eye of him who has already learned to read in the common print.

Sixth, I preserve, unchanged, the established orthography or common spelling of words.

Seventh, in order to preserve more perfectly the outline of each word or word-picture, as well as the orthography, unchanged, I employ, for silent letters, light-faced letters, (whether skeleton, hair-line, outline, or in any way made of lighter appearance or color than the others,) but otherwise of the same form, size, upright position, and general style or character as the rest of the letters, (see Drawings III, IV.)

These benefits I have aimed to secure by my invention, which combines all the material advantages of a strictly phonetic print, and all the advantages of the established orthography, with the beauty and harmony of the common print, preserving even the familiar face of each word and page, with only a slight change of expression.

The invention, therefore, consists in giving to common letters of the alphabet peculiar sounds, by peculiarities in the form or construction of said letters, while the established orthography is preserved; and in giving to combinations of letters (spelling a word) a pronunciation dependent upon the peculiar forms and style or character of the common alphabetic letters of which the word is composed; and in employing light-faced letters (skeleton, hair-line, outline, dotted, or broken-lined, phantom, or other light-faced letters) of otherwise the same general form, size, upright position, and general character, as the rest of the letters; and in employing the same, or a like phonic sign, in different alphabetic letters, to denote the same sound; and in inserting or enclosing, when desirable, a phonic sign in the skeleton or outline of an alphabetic letter, (see Drawings I, II, III, IV.)

I am aware that italic and smaller-sized letters have been used for silent letters, as already stated above.

I am also aware that accented and figured letters (letters with the figures 1, 2, 3, &c., printed over them) have been used to indicate the different sounds of the vowels.

I am also aware that accented letters, and letters with diacritical marks drawn through them, or attached to them, have been used to represent certain consonant-sounds.

I am also aware that some phonic letters, or varied forms of common letters, have been used for the purpose of indicating their different sounds; in combination with accented letters to indicate the vowel sounds; some letters with diacritical marks attached to or drawn through them to indicate some consonant-sounds, and italic consonant-letters to indicate silent consonants.

But I do not use italic, figured, accented, or smaller-sized letters in these ways or combinations; indeed, I prefer to use light-faced letters instead of them, and I greatly extend and improve upon the use of phonic letters.

In my method I employ phonic vowel and consonant-letters, by modifying the common letters and giving them peculiar forms, as circumstances may require, to denote the peculiar sound to be given to the letter; and giving a lighter face, as already described, to indicate silence, so as to retain the common orthography and the word-picture, and express the pronunciation by the peculiarities in the letters constituting the word.

The main features of the plan are—

First, to adapt elementary books to the wants of those learning to read and spell our common orthography.

Second, to retain and print the established orthography in full.

Third, to distinguish silent letters by a peculiar or lighter-faced letter of the same form as the rest, and just different or light enough to be distinct from the significant letters, while the form of the word, or the word-picture, is retained uninjured.

Fourth, to distinguish the different sounds by modifications, or special and appropriate forms of the common letters, keeping ever in view the harmony of our English print, and to preserve, as much as possible, the present general appearance of each letter, word, and page.

Fifth, to retain the best features of the different modes of teaching to read and spell now in use and most approved. This, on the above plan, can be fully done, and yet all the peculiar advantages of the phonetic method secured to the teacher and learner.

Such is a general view of the plan, and the method of practising the same will be understood from the following explanations and the accompanying drawings.

In selecting from alphabetic forms already in existence, and in devising new ones, and in employing them to denote particular sounds, according to the plan and for the purposes above described, I employ the common Roman letters to denote the sounds for which they are most frequently used in common print, as is seen in Drawings I, II, III, IV.

I select the italic letters $a$, $e$, $g$, $s$, $w$, $x$, and $y$, and, giving them an erect position, and forms in harmony with the Roman letters, employ them as seen in Drawings I, II, III.

I select, from the various phonetic forms already in existence, such as are best suited to my purpose, and employ them as seen in the drawings.

I construct and adapt new phonic forms where needed, as in Drawing I, a; 3, 6, 7, 8, 9, 10: d; 2: e; 5: $f$; 2: g; 2, 3: $h$; 2, 3: k; 2: l; 2: o; 4, 8, 9, 10: q; 2: r; 2; $t$; 2: u; 3, 5, 6, 7, 8, 9: w; 2, 3, 4, 5: y; 2, 3, 4: and employ them as seen in the drawings.

I prepare and employ various combined letters, such as are seen in Drawing I, ch; 1, 2, 3, 4, 5, 6, 7, 8, 9, 10, 11.

I prepare and employ light-faced letters to denote silent letters, as seen in Drawings III, IV, adopting the mode of making the letters light-faced, to the size and style of the letter, and the purpose for which it is used, thus:

For a small book-letter, with hair-lines, like the common Roman letters, I employ hair-line silent letters, as most suitable, as seen in Drawing III.

For an Ionic letter, having no hair-lines, and especially for a large-sized letter, for charts and children's books, I employ, for silent letters, either outline forms or letters of a lighter color, as seen in Drawing IV.

For a small Ionic or other letter having no hair-lines, I employ, for silent letters, dotted, broken-lined, or phantom letters, as taste and fitness may require.

I adapt different alphabetic letters to denote the same sound, by making the heavy or significant part of them of the same or a similar form, so as to furnish the same phonic sign while using different alphabetic letters, as seen in Drawing II; letters for short i, under the words ill, been, women, busy, lynx; letters for short e, under the words men, many, bury; and the f and h for f, as seen under the words fail, laugh, and so in other parts of the drawing.

I construct letters by inserting the phonic sign within the skeleton or outline of the common alphabetic form, as seen in Drawing I, a; 3, 6, 8, 10: c; 5: g; 2, 3: h; 2: k; 2: l; 2: o; 8, 9, 10: q; 2: u; 5, 7, 9: w; 2, 3, 4, 5: y; 2, 3, 4.

I combine the above forms for phonic and silent letters, to indicate the pronunciation of orthography, as seen in Drawings III, IV.

I claim the use of a skeleton outline, or light form of an alphabetic letter, with a phonic sign included within it, or constituting a part of it, to indicate a particular sound of that letter.

I also claim the use, in cases where several alphabetic letters must be employed for the same sound, of phonic signs closely resembling each other, so as to be substantially the same phonic sign, though used as the whole or parts of different letters.

I also claim the employment of light-faced letters, (as skeleton, hair-line, outline, or in any way made of lighter color,) of otherwise the same general form, size, upright position, and character as the rest of the font, for silent letters, in combination with phonic letters, in order to indicate the pronunciation of words without changing the common orthography and familiar outline of the word or word-picture.

I also claim the employment of phonic vowel and consonant-letters, (or peculiarly-constructed forms of the alphabetic letters,) in combination with any peculiar class of letters, for the silent letters, in order to indicate the pronunciation of words without changing the common or established orthography, substantially as described.

In witness whereof, I have hereunto set my hand, this 28th day of October, A. D. 1865.

EDWIN LEIGH.

Witnesses:
    F. GOULD,
    J. B. CROSBY.